May 29, 1962

E. F. PETERSON 3,036,819

PLURAL-CONTAINER AND MIXER MEANS

Filed April 25, 1960

INVENTOR.
E. F. PETERSON

BY

ATTORNEY

United States Patent Office 3,036,819
Patented May 29, 1962

3,036,819
PLURAL-CONTAINER AND MIXER MEANS
Edwin F. Peterson, % Martin Eng. Co., Neponset, Ill.
Filed Apr. 25, 1960, Ser. No. 24,370
10 Claims. (Cl. 259—23)

This invention relates to a container and more particularly to a container adapted to contain a plurality of substances which are capable of being mixed within the container.

The invention finds particular utility in the packaging of epoxy resins and curing agents intended for use therewith. As is well known, such epoxy resins or epoxides are capable of producing infusible and insoluble reaction products, particularly when admixed with accelerators or curing agents. As is also well known, one of the difficulties in the use of such mixtures or substances is that involving the preparation of suitable quantities of the substances for use, because proper proportions are relatively critical and in addition excess quantities prepared are unsuitable for further use because of the very characteristics of the epoxide-curing agent that makes it so desirable; that is, it becomes infusible and quantities prepared and not used are wasted.

It is accordingly the principal object of the invention to provide an improved container means in which plural-substances may be initially contained out of contact with each other, together with means for permitting mixing of the substances in the container after release of one substance into contact with the other. It is a further object of the invention to adapt the means for use with the packaging of epoxy resins and curing agents of the character noted; although, other substances may similarly be packaged. A further object of the invention is to provide inner and outer containers so proportioned that each contains a predetermined quantity of the respective substance in terms of the relative quantities of the substances required to produce the ultimate mixture. Further objects of the invention reside in means for dispensing the mixed substances, the construction of a simple and economical container means for the purposes described, and such other and features and advantages as will appear to those versed in the art as preferred embodiments of the invention are disclosed in detail in the ensuing description and accompanying sheet of drawings, the several figures of which are described below.

Figure 1:
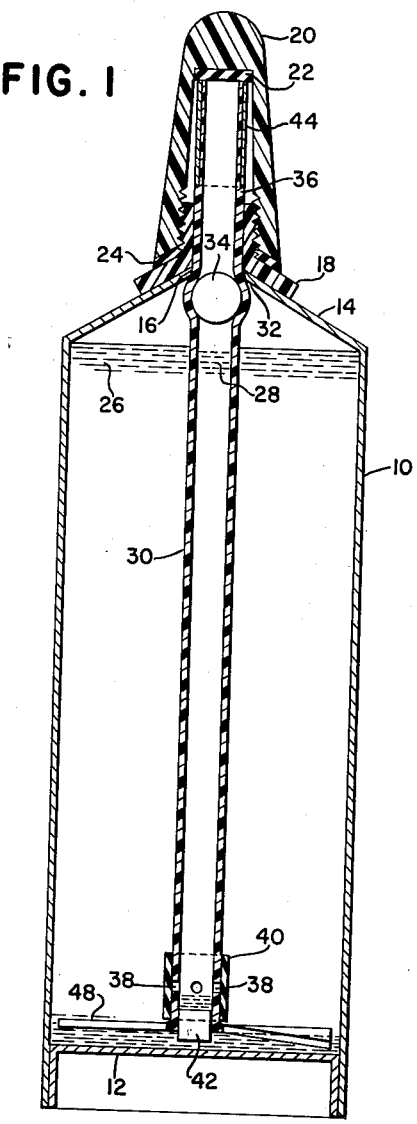
FIGURE 1 is an enlarged longitudinal section through one form of container means, illustrating the components in normal or quiescent position.
Figure 2:
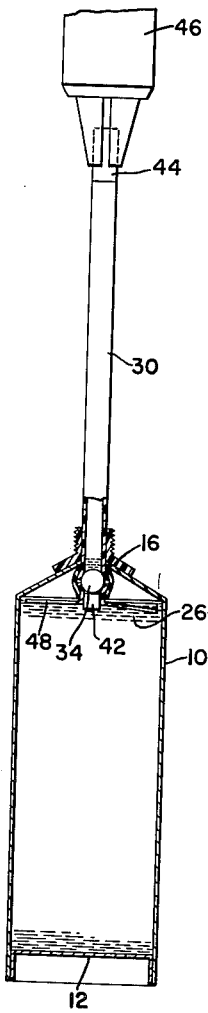
FIGURE 2 illustrates the use of the container means with an external tool for releasing the contents of the inner container into contact with those of the outer container while simultaneously agitating or mixing the two substances.
Figure 3:
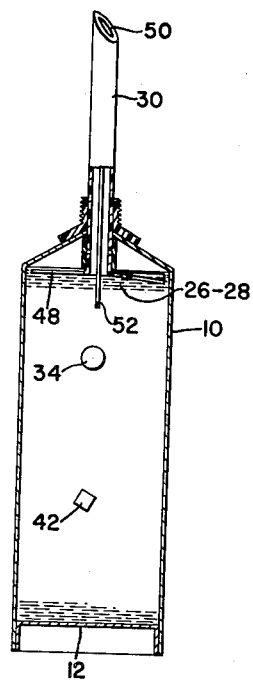
FIGURE 3 is a view similar to FIGURE 2 but shows the preparation of the now extending inner container as means for capacitating the container means to dispense the mixed substances.

The container means shown in FIGURES 1, 2 and 3 comprises an outer relatively large container 10 having a peripheral or annular wall means closed at its bottom by a bottom wall 12 and completed at its top by a somewhat conical upper wall 14 which is centrally formed with an aperture 16. The container is adapted to hold a substance, which may be an epoxy resin of the character referred to, and therefore should be constructed of a material which will not react with the resin. In the present case, any suitable pliable material is used so that manual pressure may be applied to the walls of the container for facilitating dispensing of the contents, the details of which will be set forth below. The top wall 14 is supplemented by a fitting 18, rigidly carried thereby in any suitable manner, and threaded to receive a removable closure or cap 20, which cap may be equipped with suitable gaskets as at 22 and 24. For purposes of ready reference, the substance or contents of the outer container 10 are designated by the numeral 26.

In the initial or storage condition of the container means, the substance 26 is isolated from or kept out of contact with a second substance 28 contained within an inner container in the form of a tube 30. In the present case, the tube 30 is coaxially received through the opening 16, and that portion of the top wall 14 that surrounds or borders the opening 16 may be regarded as neck means 32 which functions in conjunction with piston means, here a ball 34, for performing the initial function of confining the contents 28 to the tube 30 and for ultimately serving to expel the contents 28 into the contents or substance 26.

As will be seen, the tube 30 is of flexible pliable material of any suitable character, preferably one, of course, that does not react with the substance 26 or the substance 28, the latter being representative of a curing agent used with the epoxy resin according to the outline given above. The relative sizes of the ball 34 and the cross-sectional area of the tube 30 are such that the ball 34 initially increases the cross-sectional area of the tube 30 just inwardly of the aperture 16 and neck 32. Stated otherwise, the ball 34 is of such size as to be incapable of outward passage through the extension tube part 36 that extends outwardly through the aperture 16. The annular wall of the tube 30, in combination with the neck means 32 and ball 34, comprises reducing means or restricting means for operating on the tube 30 and its contents in such manner that when the tube 36 is withdrawn at least partially axially from the container 10, the ball 34 serves as a piston and the portion of the tube 30 below the ball serves as a cylinder moving past the piston as the tube is axially withdrawn. This in effect reduces the volumetric capacity of the tube 30 below the ball and accordingly the volume of the substance 28 must be either compressed or expelled. The latter is of course the course taken by the substance and for this purpose the lower end of the tube 30, adjacent to the lower wall 12 of the container 10, is provided with an outlet, here in the form of a plurality of radial ports 38 normally closed by a closure in the form of an annular resilient valve means 40 which surrounds the lower end portion of the tube 30 so as to block the ports 38. Additionally, the lower end of the tube 30 is closed by a plug 42. Consequently, as long as the relative movement described above is not applied to the two containers 10 and 30, the contents 28 will remain confined to the tube 30 and therefore are incapable of being mixed with the contents 26 of the container 10. As previously discussed, the proportions of the two substances may be predetermined and the container-plural may be respectively charged according thereto.

As will be seen, the cap 20, when in place, closes the outer end part 36 of the tube as well as generally closing the container 10. Thus, when the cap 20 is removed, the outer part 36 is accessible for the application thereto of the necessary forces to move the containers relative to each other to accomplish the results outlined above. In the present case, the application of force is augmented by providing the outer end part 36 of the tube 30 with a drive-receiving element in the form of a steel sleeve or its equivalent, designated here by the numeral 44. When the cap 22 is removed, the sleeve 44 is available for insertion into a suitable tool that will impart both axial and angular movement to the tube. A suitable tool is, for example, an electric drill, the chuck of which is illustrated at 46 in FIGURE 2. The chuck of course is capable of being tightened to provide an adequate grip by means of which the tube 30 may be axially withdrawn so as to effect operation of the reducing means 16—32—34, at the same time rotating the tube 30 to operate agitating means at the lower end thereof, which here takes the form of a spinner or split disc 48 secured, in any suitable fashion, to the lower end of the tube 30. Thus, as the portion of the tube 30 below the piston or ball 34 is pressurized, the contents or substance 28 is expelled through the ports 38, because the elastic band 40, will, of course, yield to permit expulsion of the contents into mixing relation with the substance or contents 26, the two substances being agitated or mixed by the spinner or agitating means 48 as the tube 30 is moved axially outwardly as well as being rotated. FIGURE 2 shows the intermediate result obtained when the tube 30 is axially withdrawn to the extent necessary. The tube may be regarded as stoppable in this position because of the stop means effected by the abutment established at the lower end of the tube because of the inability of the annulus or valve ring 40 and spinner 48 to pass through the opening 16.

The container means may be capacitated for dispensing the mixed contents in a manner suggested in FIGURE 3, which shows that the tube 30, being made of suitable plastic material, may be severed at 50—preferably obliquely—to provide a dispensing outlet. At this point, the blockade established by the ball 34 and plug 42 may be removed by the insertion through the open end 50 of the tube 30 of a stiff wire or other suitable tool, suggested at 52, for the purpose of dislodging the ball 34 which in turn dislodges the plug 42. In the first place, the plug 42 fits the lower end of the tube 30 with a friction fit having a higher resistance to dislodgment than the resilient valve ring 40 has to expansion. Accordingly, axial withdrawal of the tube 30 will not alone discharge the plug; although, in some conditions, the outlet may be controlled entirely by the plug 42, as will be brought out below. In the present case, suffice it to say that the piston 34 and plug 42 may be dislodged as shown in FIGURE 3 so that the contents, already mixed, may be dispensed through the tube 30 as capacitated at 50. As already indicated, the walls of the container 10 may be pliable, a common expedient, for the purpose of expelling the contents through the tube 30. In the present contemplation of the invention, the mixed contents 26—28 may be regarded as a "one-shot" application and the empty container is disposable.

Figure 4:
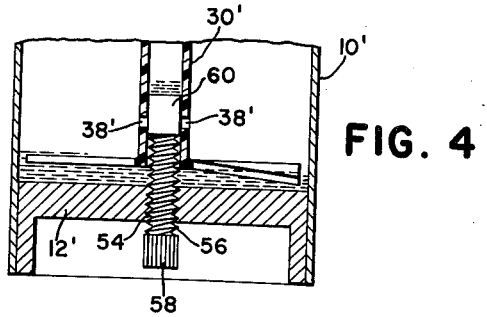
FIGURE 4 is an enlarged fragmentary section showing a modified form of closure means for the inner container.

In that form of the invention shown in FIGURE 4, the container is modified at its lower portion, as is the tube, and accordingly, for purposes of clarity, the two parts will be designated respectively by the reference characters 10′ and 30′. The container 10′ has a bottom wall 12′ which has therein a central tapped bore 54 within which is carried an externally threaded element or screw 56 having an outer end or head 58 available exteriorly of the container means. The inner end of the screw 56 is connected to or provided as a plug 60 which fits the lower end of the tube 30′ and which initially blocks radial ports 38′ in the tube.

The operation of this form of the container means is similar to that previously described, with the exception that, before the tube 30′ is axially withdrawn, the screw 56 is unscrewed so as to move the plug 60 axially downwardly to expose the radial ports 38′. Thereupon, the tube 30′ can be axially withdrawn as before and the contents of the tube 30′ will be expelled through the port 38′ to be mixed with the contents of the container 10′. Of course, in those cases in which the charging of the tube 30′ is such as to provide a slight void therein, the void will accommodate axial withdrawal of the tube 30′ to an extent sufficient to clear the plug 60 without unscrewing the screw 56. In either event, the closure means established is similar in all respects to that shown in FIGURE 4, which in turn is broadly similar to that described in connection with FIGURES 1, 2 and 3. There is this difference, however, in that in the FIGURE 4 structure the plug need not be dislodged as was the plug 42 in FIGURE 3, but the piston 34 will have to be dislodged in order to capacitate the tube 30′ for dispensing the contents of the container means.

The foregoing and other advantages of the container means will be readily apparent to those versed in the art, as will the method by means of which the container means may be operated, which method embraces the broad principle of packaging the two substances in the first place out of contact with each other and enabling the mixing thereof within the container means, especially in predetermined proportions. The container means is relatively simple in construction and operation and is especially adapted to use with readily available tools, such as the electric drill; although, other rotating devices may be used. Similarly, the advantages of the invention may be exploited in forms widely different from those disclosed, all without departure from the spirit and scope of the invention.

What is claimed is:

1. A plural-substance container and mixer means, comprising: an outer container having walls and containing a first flowable substance, one of said walls having an aperture therethrough; an inner container comprising a tube pre-packaged within the outer container and extending at least in part into said first substance and having a portion extending outwardly into the aperture for access thereto from outside the outer container, said tube being mounted for at least partial withdrawal thereof through the aperture and containing a second flowable substance, said tube having a normally closed outlet within the first substance and relatively remote from the aperture and controllable to open in response to forces applied externally of the outer container means, and said tube being of pliable deformable material capable of being reduced in volumetric capacity intermediate the aperture and the outlet; reducing means operative to deform the tube responsive to withdrawal thereof through said aperture and thus to reduce the volumetric capacity thereof so as to expel said second substance through the outlet for mixing with the first substance within the outer container; and said containers being capacitated to dispense the mixed substances.

2. The invention defined in claim 1, in which: the reducing means includes neck means on the wall and surrounding the aperture, and piston means in the tube inwardly of the neck means and of greater cross-section than the aperture so that said withdrawal of the tube engages the piston means with the neck means and causes the piston means to expel said second substance through the tube outlet.

3. The invention defined in claim 1, in which: the tube has agitator means thereon operative to mix the two substances as the tube is withdrawn.

4. The invention defined in claim 1, in which: internal valve means is provided for the outlet and is normally biased to close said outlet, and said valve means is operative to open said outlet responsive to pressurizing of the tube incident to the reduction in volumetric capacity thereof.

5. The invention defined in claim 1, in which: the outer container has a second wall adjacent to the tube outlet, a releasable closure normally closes said outlet, and means is carried by said second wall for releasing said closure.

6. The invention defined in claim 5, in which: said tube is open at its end adjacent to said second wall, said closure is a plug normally plugging said open end, and said means for releasing the closure comprises an element carried by said second wall and connected to the plug for enabling relative movement between the tube and plug to withdraw said plug.

7. The invention defined in claim 1, in which: the tube has an open end remote from the aperture, the outlet comprises a radial port in the tube adjacent to said end, a removable plug normally closes said end and is clear of the port, valve means is carried by the tube and biased to close the port but openable in response to pressurizing of the tube incident to withdrawal thereof, and said outer part of the tube is capacitated to provide an external opening for the receipt of a tool inserted through the tube to dislodge the plug so that the substances are dispensable through said external opening.

8. The invention defined in claim 1, in which: said accessible portion of the tube is closed, said tube when withdrawn is capable of being severed between said closed portion and the aperture to capacitate the container means for dispensing the mixed substances, and said reducing means being so constructed as to enable at least partial removal of the reducing action thereof so as to facilitate dispensing of said substances.

9. A plural-substance container and mixer means, comprising: an outer container having walls and containing a first flowable substance, one of said walls having an aperture therethrough; an inner container comprising a tube pre-packaged within the outer container and having a portion extending outwardly into the aperture for access thereto from outside the outer container, said tube containing a second flowable substance, said tube having a normally closed outlet within the outer container substance and controllable to open in response to forces applied externally of the outer container, and said tube being of pliable deformable material capable of being reduced in volumetric capacity so as to expel said second substance through said outlet and into the outer container substance; reducing means carried by the container means and operative to deform the tube and thus to reduce the volumetric capacity thereof so as to expel said second substance through the outlet for mixing with the first substance within the outer container; and one of said containers being capacitated to dispense the mixed substances.

10. A plural-substance container and mixer means, comprising: an outer container having walls and containing a first flowable substance, one of said walls having an aperture therethrough; an inner container comprising a tube pre-packaged within the outer container and having a portion extending outwardly into the aperture for access thereto from outside the outer container, said tube containing a second flowable substance, said tube having a normally closed outlet within the outer container substance and controllable to open in response to forces applied externally of the outer container; and piston means movably carried in the tube initially remote from the outlet, said tube and piston means being relatively movable lengthwise of the tube by force applied externally of the outer container for expelling said second substance through the outlet and into and for mixing with the outer container substance.

References Cited in the file of this patent

UNITED STATES PATENTS

| | | |
|---|---|---|
| 2,037,989 | Macklanburg | Apr. 21, 1936 |
| 2,791,359 | Wigert et al. | May 7, 1957 |
| 2,799,434 | Malko | July 16, 1957 |
| 2,819,738 | Marberg | Jan. 14, 1958 |
| 2,880,913 | Peyron | Apr. 7, 1959 |
| 2,921,718 | Meissner | Jan. 19, 1960 |